United States Patent
Kurak, Jr. et al.

(10) Patent No.: US 6,697,427 B1
(45) Date of Patent: Feb. 24, 2004

(54) METHODS AND APPARATUS FOR IMPROVED MOTION ESTIMATION FOR VIDEO ENCODING

(75) Inventors: Charles W. Kurak, Jr., Durham, NC (US); Christian H. L. Moller, Cary, NC (US)

(73) Assignee: PTS Corporation, San Jose, CA (US)

( * ) Notice: Subject to any disclaimer, the term of this patent is extended or adjusted under 35 U.S.C. 154(b) by 0 days.

(21) Appl. No.: 09/432,705

(22) Filed: Nov. 2, 1999

Related U.S. Application Data

(60) Provisional application No. 60/106,867, filed on Nov. 3, 1998.

(51) Int. Cl.[7] ............................................. H04N 7/12
(52) U.S. Cl. ............................................. 375/240.03
(58) Field of Search ............... 348/14.09; 375/240.01, 375/240.03, 240.12–240.16, 240.18, 240.2, 240.24; 382/232, 236, 238, 248, 250, 251; 712/11; H04N 7/12, 7/30, 7/32

(56) References Cited

U.S. PATENT DOCUMENTS

| | | | | |
|---|---|---|---|---|
| 5,408,274 A | | 4/1995 | Chang et al. ............... 348/700 |
| 5,424,778 A | * | 6/1995 | Sugiyama et al. ........ 375/240.2 |
| 5,528,299 A | * | 6/1996 | Dufour et al. ......... 375/240.13 |
| 5,790,686 A | * | 8/1998 | Koc et al. .................... 382/250 |
| 5,796,434 A | * | 8/1998 | Lempel ................. 375/240.16 |
| 5,870,146 A | * | 2/1999 | Zhu ...................... 375/240.03 |
| 6,167,501 A | * | 12/2000 | Barry et al. ................... 712/11 |
| 6,300,973 B1 | * | 10/2001 | Feder et al. ............. 348/14.09 |
| 6,483,876 B1 | * | 11/2002 | Chang et al. .......... 375/240.16 |
| 6,498,815 B2 | * | 12/2002 | Kleihorst et al. ........ 375/240.2 |
| 6,501,799 B1 | * | 12/2002 | Kohn .................... 375/240.24 |

* cited by examiner

Primary Examiner—Richard Lee
(74) Attorney, Agent, or Firm—Priest & Goldstein, PLLC

(57) ABSTRACT

A new motion estimation system and process for video compression is presented. The approach is computationally less expensive than typical spatial domain block matching algorithms. The search for matching blocks is performed in the frequency domain making extensive use of data already computed by the video encoding process. Moreover, additional good block matches can be recognized with this approach. A multi-tiered approach may be employed to combine the frequency domain analysis with existing spatial domain techniques.

27 Claims, 6 Drawing Sheets

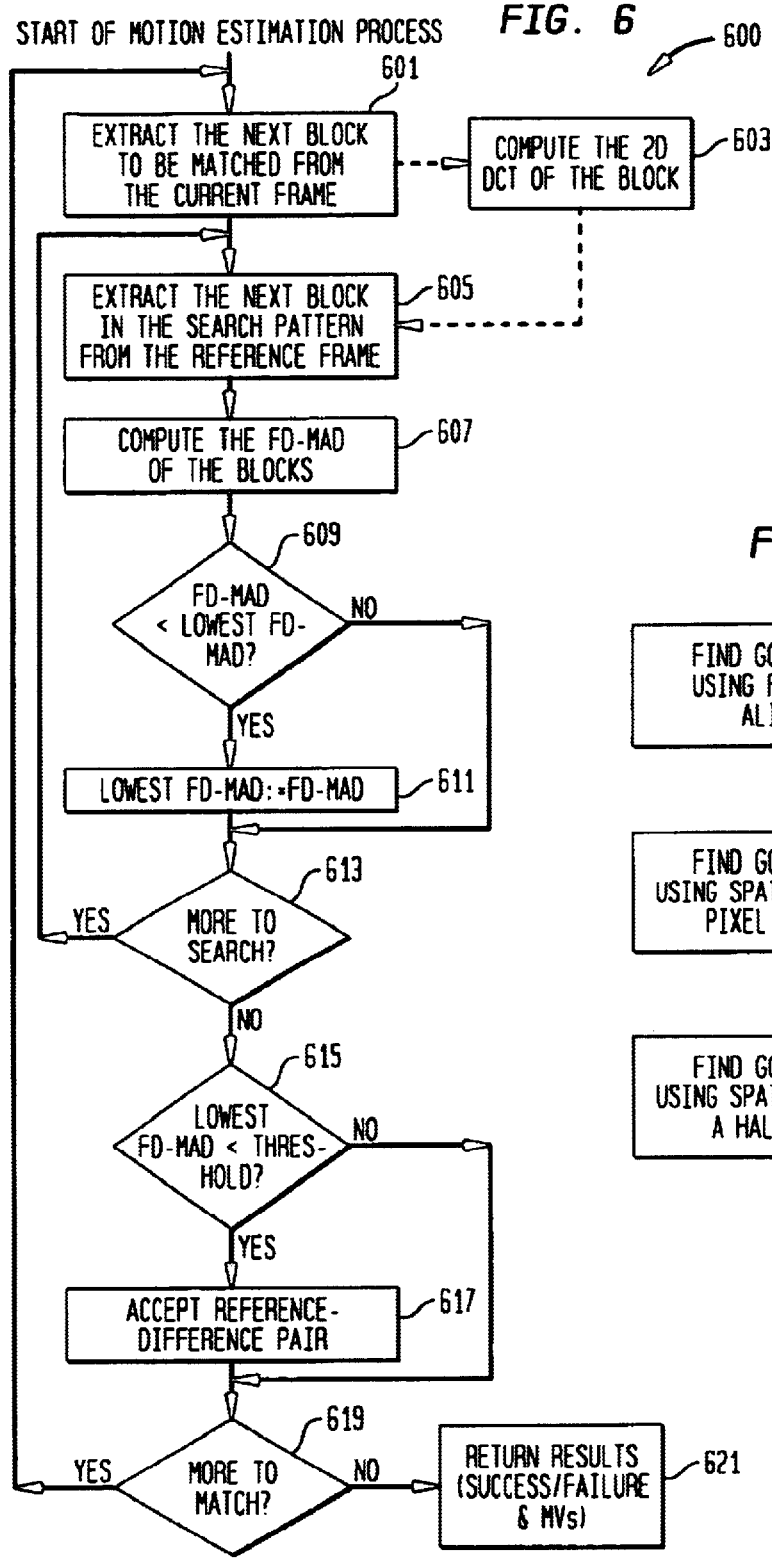

METHODS AND APPARATUS FOR IMPROVED MOTION ESTIMATION FOR VIDEO ENCODING

RELATED APPLICATIONS

The present invention claims the benefit of U.S. Provisional Application Serial No. 60/106,867 entitled "Methods and Apparatus for Improved Motion Estimation for Video Encoding" and filed Nov. 3, 1998.

FIELD OF THE INVENTION

The present invention relates generally to improvements in video encoding, for example, the encoding employed in such encoding standards as MPEG-1, MPEG-2, H.261, H.263, and motion estimation. More particularly, it relates to advantageous techniques for applying frequency domain analysis to motion estimation.

BACKGROUND OF THE INVENTION

The moving pictures expert group (MPEG) video compression standards, MPEG-1 (ISO 11172-2) and MPEG-2 (ISO 13818-2), employ image processing techniques at multiple levels. Of interest to the present invention is the processing of 16×16 macroblocks and 8×8 blocks. In the terminology used by the MPEG standards, a "frame" is an X by Y image of pixels, or picture elements. Each pixel represents the smallest discrete unit in an image. The "pixel", in MPEG usage, consists of three color components, one luminance and two chrominance values, Y, Cb, and Cr, respectively. Each frame is subdivided into 16×16 "macroblocks" of pixels. A grouping of macroblocks is called a "slice". Each macroblock is further sub-divided into 8×8 "blocks" of pixels. A macroblock is typically comprised of four luminance (Y) and two or more chrominance ($C_b$ and $C_r$) blocks. A more detailed description of luminance and chrominance is included in the MPEG-1 and MPEG-2 specifications. A sequence of frames ultimately makes up a video sequence.

One of the key compression methods used in MPEG is the discrete cosine transform (DCT) or the two dimensional discrete cosine transform (2D-DCT) coupled with quantization. During the encoding process, each block is transformed from its spatial-domain representation or its actual pixel values to a frequency-domain representation utilizing a two-dimensional 8×8 DCT. The quantization has the effect of deemphasising or eliminating visual components of the block with high spatial frequencies not normally visible to the human visual system, thus reducing the volume of data needed to represent the block. The quantization values used by the MPEG protocols are in the form of a quantization scale factor, included in the encoded bitstream, and the quantization tables. There are default tables included in the MPEG specification. However, these can be replaced by quantization tables included in the encoded bitstream. The decision as to which scale factors and tables to use is made by the MPEG encoder.

One of the fundamental methods used by the MPEG protocol is a mechanism whereby a macroblock within a single frame within a sequence of frames is represented in a motion vector (MV) encoded format. An MV represents the spatial location difference between that macroblock and a reference macroblock from a different, but temporally proximate, frame. Note that whereas DCT compression is performed on a block basis, the MVs are determined for macroblocks.

MPEG classifies frames as being of three types: I-frame (Intra-coded), P-frame (Predictive-coded), and B-frame (Bidirectionally predictive-coded). I-frames are encoded in their entirety. All of the information to completely decode an I-frame is contained within its encoding. I-frames can be used as the first frame in a video sequence, as the first frame of a new scene in a video sequence, as reference frames described further below, as refresh frames to prevent excessive error build-up, or as error-recovery frames, for example, after incoming bitstream corruption. They can also be convenient for special features such as fast forward and fast reverse.

P-frames depend on one previous frame. This previous frame is called a reference frame, and may be the previous I-frame, or P-frame, as shown below. An MV associated with each macroblock in the P-frame points to a similar macroblock in the reference frame. During reconstruction, or decoding, the referenced macroblock is used as the starting point for the macroblock being decoded. Then, a, preferably small, difference macroblock may be applied to the referenced macroblock. To understand how this reference-difference macroblock combination works, consider the encoding process of a P-frame macroblock. Given a macroblock in the P-frame, a search is performed in the previous reference frame for a similar macroblock. Once a good match is found, the reference macroblock pixel values are subtracted from the current macroblock pixel values. This subtraction results in a difference macroblock. Also, the position of the reference macroblock relative to the current macroblock is recorded as an MV. The MV is encoded and included in the encoder's output. This processing is followed by the DCT computation and quantization of the blocks comprising the difference macroblock. To decode the P-frame macroblock, the macroblock in the reference frame indicated by the MV is retrieved. Then, the difference macroblock is decoded and added to the reference macroblock. The result is the original macroblock values, or values very close thereto. Note that the MPEG encoding and decoding processes are categorized as lossy compression and decompression, respectively.

The idea is that the encoding of the MV and the difference information for a given macroblock will result in a smaller number of bits in the resulting bitstream than the complete encoding of the macroblock by itself. Note that the reference frame for a P-frame is usually not the immediately preceding frame. A sample ordering is given below.

B-frames depend on two reference frames, one in each temporal direction. Each MV points to a similar macroblock in each of the two reference frames. In the case of B-frames, the two referenced macroblocks are averaged together before any difference information is added in the decoding process. Per the MPEG standard, B-frame is not used as a reference frame. The use of B-frames normally results in a more compact representation of each macroblock.

A typical ordering of frame types would be $I_1$, $B_2$, $B_3$, $P_4$, $B_5$, $B_6$, $P_7$, $B_8$, $B_9$, $I_{10}$, and so on. Note that the subscripts refer to the temporal ordering of the frames. This temporal ordering is also the display ordering produced by the MPEG decoder. The encoded ordering of these frames, found in an MPEG bitstream, is typically different: $I_1$, $P_4$, $B_2$, $B_3$, $P_7$, $B_5$, $B_6$, $I_{10}$, $B_8$, $B_9$, and so forth. The first frame is always an I-frame. As mentioned above, an I-frame has no temporal dependencies upon other frames, therefore an I-frame contains no MVs. Upon completion of the decoding of this frame, it is ready for display. The second frame to be decoded is $P_4$. It consists of MVs referencing $I_1$ and differences to be applied to the referenced macroblocks. After completion of the decoding of this frame, it is not displayed, but first held in reserve as a reference frame for decoding $B_2$ and $B_3$, then displayed, and then used as a reference frame for decoding $B_5$ and $B_6$. The third frame to be decoded is $B_2$. It consists of pairs of MVs for each macroblock that reference $I_1$ and $P_4$ as well as any difference information. Upon completion of the decoding of $B_2$, it is ready for display. The decoding then proceeds to $B_3$. $B_3$ is decoded in the same manner as $B_2$ $B_3$'s MVs reference $I_1$ and $P_4$. $B_3$ is then displayed, followed by the display of $P_4$. $P_4$ then becomes the backward-reference frame for the next set of frames. Decoding continues in this fashion until the entire set of frames, or video sequence, has been decoded and displayed.

A video sequence generally approximates the appearance of smooth motion. In such a sequence, a given block of pixels in a given frame will be similar in content to one or more spatially proximate blocks in a range of temporally proximate frames. Given smooth real motion within a scene represented by such a sequence, and smooth apparent motion caused by changes in the orientation, point of view, and characteristics such as field width, for example, of the recorder of such a sequence, the positions of blocks that exhibit the greatest similarity across a number of temporally adjacent frames is very likely to be approximately spatially linear with respect to a fixed reference such as the common origin of the frames. The process of identifying the positions of such similar blocks across a range of frames is referred to as motion estimation. The spatial relationship among such blocks is referred to as the motion vector.

Historically, the measure of similarity between blocks has been represented by the pixel-wise sum or mean of the absolute differences (SAD or MAD, respectively) between the given macroblock and the reference macroblock or macroblocks. The SAD is defined as the sum of the absolute value of the differences between the spatially collocated pixels in the given macroblock and the reference macroblock. The MAD can be determined by computing the SAD, then dividing by the number of pixels in the given macro block, for example, 256 in a 16×16 macroblock. To differentiate between current techniques and the techniques of the present invention, the prior art spatial domain mean of absolute differences will be referred to as SD-MAD and the prior art spatial domain sum of absolute differences will be referred to as SD-SAD.

Much of the computational effort expended by the typical MPEG encoder is used in locating macroblocks of pixels, within a window of macroblocks, in the reference frame or frames that yield the least SD-SAD or the least SD-MAD for a given macroblock. Large search window sizes are needed to compress fast motion such as might be found in a video sequence of a sporting event.

The MPEG protocol represents an image in the frequency domain using DCT processing with quantization for compression reasons, yet motion estimation is typically performed in the spatial-domain. For example, implementations of block matching algorithms are readily found in the literature. These algorithms typically use an SD-MAD or an SD-SAD computation. In the following discussion of both existing algorithms and the new invention, the MAD statistic is used, but can readily be substituted by the SAD. The relationship between the two is one of a single constant. In other words, this constant is the number of values being considered, such as 256 for an MPEG macroblock. Spatial-domain similarity analysis has as a basic assumption that the SD-MAD of two pixel macroblocks correlates with the volume of data required to represent the 2D-DCT of the difference between the blocks. While this assumption may be valid, it is not the only possible correlation. Consider, as an extreme case, two frames with the first frame being completely white (i.e., the luminance of all values is equal to 255), and the second frame being completely black with all values equal to zero. Assume that the white frame is being used as a reference for the black P-frame, it is necessary to try to match the black blocks of the new frame against the white blocks of the I-frame. In the spatial domain, the SD-MAD of any pair of black and white blocks is 255, the worst possible value, making them, prima facie, poor candidates as a reference-difference pair. A typical spatial-domain motion estimator would not consider them. fact, the quantized 2D-DCT of the difference between these blocks is:

| 255 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 | which conntains exactly one non-zero quantity. Due to the characteristics of MPEG variable-length coding, the DCT of the difference can be expressed very compactly, actually making these blocks a good reference-difference pair, even though the blocks have an extremely poor SD-MAD.

As a more complex example, FIGS. 1A and 1B show a pair of pixel blocks: a reference block 10 and a sample block 12. These blocks 10 and 12 are represented by the below values:

| Reference block 10 | | | | | | | | Sample block 12 | | | | | | | |
|---|---|---|---|---|---|---|---|---|---|---|---|---|---|---|---|
| 2 | 20 | 38 | 56 | 74 | 92 | 110 | 128 | 254 | 236 | 218 | 200 | 182 | 164 | 146 | 128 |
| 20 | 38 | 56 | 74 | 92 | 110 | 128 | 146 | 236 | 218 | 200 | 182 | 164 | 146 | 128 | 110 |
| 38 | 56 | 74 | 92 | 110 | 128 | 146 | 164 | 218 | 200 | 182 | 164 | 146 | 128 | 110 | 92 |
| 56 | 74 | 92 | 110 | 128 | 146 | 164 | 182 | 200 | 182 | 164 | 146 | 128 | 110 | 92 | 74 |
| 74 | 92 | 110 | 128 | 146 | 164 | 182 | 200 | 182 | 164 | 146 | 128 | 110 | 92 | 74 | 56 |
| 92 | 110 | 128 | 146 | 164 | 182 | 200 | 218 | 164 | 146 | 128 | 110 | 92 | 74 | 56 | 38 |
| 110 | 128 | 146 | 164 | 182 | 200 | 218 | 236 | 146 | 128 | 110 | 92 | 74 | 56 | 38 | 20 |
| 128 | 146 | 164 | 182 | 200 | 218 | 236 | 254 | 128 | 110 | 92 | 74 | 56 | 38 | 20 | 2 |

A spatial-domain difference for these blocks 10 and 12

| 252 | 216 | 180 | 144 | 108 | 72 | 36 | 0 |
| 216 | 180 | 144 | 108 | 72 | 36 | 0 | −36 |
| 180 | 144 | 108 | 72 | 36 | 0 | −36 | −72 |
| 144 | 108 | 72 | 36 | 0 | −36 | −72 | −108 |

-continued

| 108 | 72  | 36  | 0    | -36  | -72  | -108 | -144 |
| 72  | 36  | 0   | -36  | -72  | -108 | -144 | -180 |
| 36  | 0   | -36 | -72  | -108 | -144 | -180 | -216 |
| 0   | -36 | -72 | -108 | -144 | -180 | -216 | -252 | quantifies the obvious, that there is little spatial-domain similarity between them. The SD-MAD is 94. The zigzag ordered, quantized 2D-DCT of the difference, however,

| 0 | 41 | 41 | 0 | 0 | 0 | 3 | 0 |
| 0 | 3  | 0  | 0 | 0 | 0 | 0 | 1 |
| 0 | 0  | 0  | 0 | 1 | 0 | 0 | 0 |
| 4 | 0  | 0  | 0 | 0 | 0 | 0 | 0 |
| 0 | 0  | 0  | 0 | 0 | 0 | 0 | 0 |
| 1 | 0  | 0  | 0 | 0 | 0 | 0 | 0 |
| 0 | 0  | 0  | 0 | 0 | 0 | 0 | 0 |
| 0 | 0  | 0  | 0 | 0 | 0 | 0 | 0 | is a great deal more promising for compression.

As the foregoing analysis demonstrates, spatial-domain similarity, such as SD-MAD, is not always the best criterion from which to determine good reference-difference block pairs for motion estimation. While pairs that exhibit great spatial-domain similarity can very likely yield minimal difference blocks under variable length coding, such analysis can miss pairs that exhibit far better compression. The present invention recognizes that the spatial-domain measurement of the prior art is not necessarily ideal, and it provides an advantageous alternative criterion and a method of implementation that typically achieves better results than an SD-MAD or an SD-SAD approach. As further addressed below, the approach of the present invention is also significantly less computation intensive.

SUMMARY OF THE INVENTION

One aspect of a motion estimation and compensation process and apparatus in accordance with the present invention is the minimization of the volume of data in the frequency domain, as contrasted with the spatial domain, needed to describe the difference between two blocks. Additionally, in accordance with the present invention, inspection can be performed at the level of the quantized 2D-DCTs of the blocks and not at the level of the pixel blocks. Moreover, a smaller number of values need be inspected in the frequency domain, whereas all of the spatial domain values must be included in the typical spatial domain analysis. Blocks that will be missed by spatial-domain analysis will be identified. Better compression and faster computation thereby may be achieved.

A more complete understanding of the present invention, as well as other aspects, features and advantages of the invention will be apparent from the following Detailed Description and the accompanying drawings.

BRIEF DESCRIPTION OF THE DRAWINGS

FIG. 6 illustrates an improved motion estimation process in accordance with the present invention;

FIG. 7 shows a hierarchical method of motion estimation in accordance with the present invention.

DETAILED DESCRIPTION

Figure 1A:
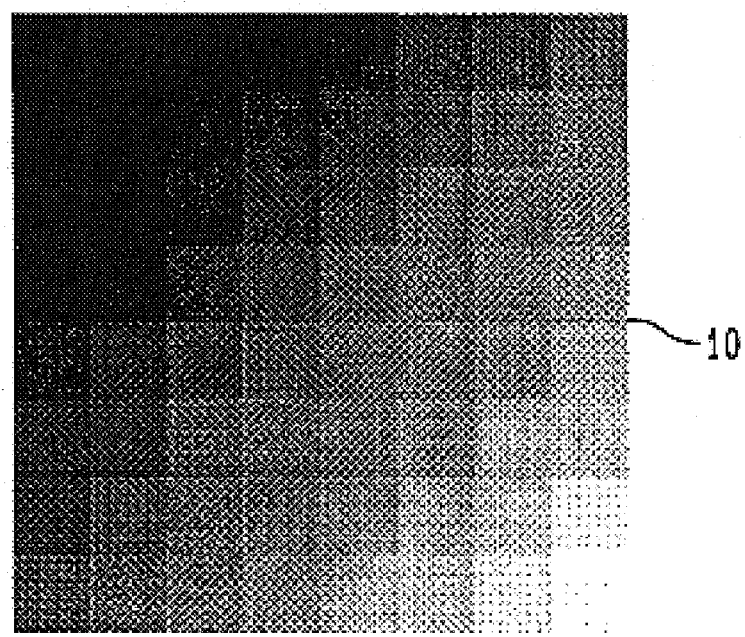
FIGS. 1A and 1B illustrate exemplary reference and sample blocks having little spatial-domain similarity.
Figure 1B:
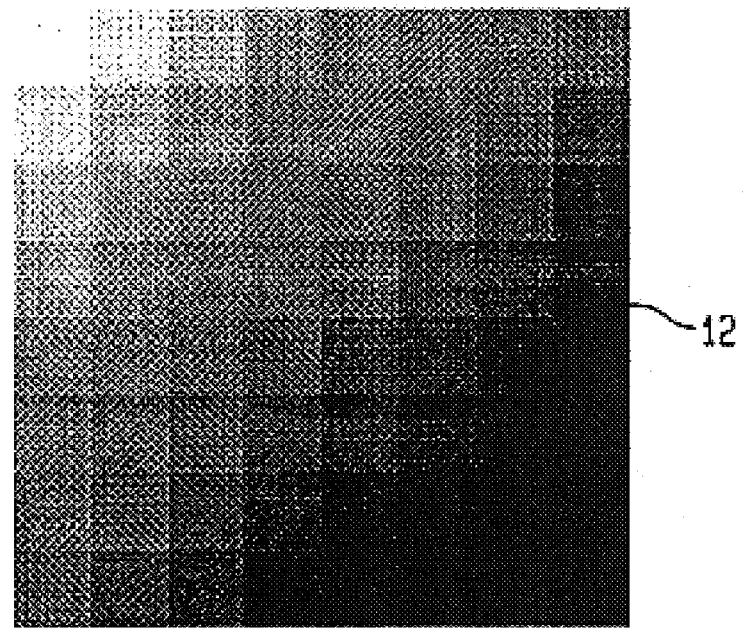

Referring again to FIGS. 1A and 1B and the associated tables of values, the problem is to determine how so spatially dissimilar blocks can be identified as similar in the frequency domain. When the blocks are examined in frequency domain, this similarity is apparent. The following tables show the quantized 2D-DCT for each of the blocks 10 and 12:

| Reference block 10 | | | | | | | | Sample block 12 | | | | | | | |
|---|---|---|---|---|---|---|---|---|---|---|---|---|---|---|---|
| 128 | -20 | 0 | -2 | 0 | 0 | 0 | 0 | 128 | 20 | 0 | 2 | 0 | 0 | 0 | 0 |
| -20 | 0 | 0 | 0 | 0 | 0 | 0 | 0 | 20 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| -2 | 0 | 0 | 0 | 0 | 0 | 0 | 0 | 2 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |

For increased compression in conjunction with the run length encoding used in the MPEG protocol, a zigzag scan ordering is used. One of the two zigzag scan orderings is shown in the following table:

| 0  | 1  | 5  | 6  | 14 | 15 | 28 | 28 |
| 2  | 4  | 7  | 13 | 16 | 26 | 29 | 42 |
| 3  | 8  | 12 | 17 | 25 | 30 | 41 | 43 |
| 9  | 11 | 18 | 24 | 31 | 40 | 44 | 53 |
| 10 | 19 | 23 | 32 | 39 | 45 | 52 | 54 |
| 20 | 22 | 33 | 38 | 46 | 51 | 55 | 60 |
| 21 | 34 | 37 | 47 | 50 | 56 | 59 | 61 |
| 35 | 36 | 48 | 49 | 57 | 58 | 62 | 63 |

The similarity is even more apparent when the DCT's are represented in the zigzag scan order:

| Reference block 10 | | | | | | | | Sample block 12 | | | | | | | |
|---|---|---|---|---|---|---|---|---|---|---|---|---|---|---|---|
| 128 | −20 | −20 | 0 | 0 | 0 | −2 | 0 | 128 | 20 | 20 | 0 | 0 | 0 | 2 | 0 |
| 0 | −2 | 0 | 0 | 0 | 0 | 0 | 0 | 0 | 2 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |

Not only is the frequency domain mean of absolute differences (FD-MAD) of the two block DCTs very low (≈1), if the FD-MAD is computed using the zigzag order, it only requires the consideration of the first ten coefficients. The original ordering would require the comparison of the first 25 coefficients, in row-major order, to achieve the same results. The remaining 54 coefficients are all zeroes. The present invention recognizes that only a reduced number of coefficients may be advantageously considered in the FD-MAD. Moreover, the number of coefficients may be varied between implementations. Furthermore, the number coefficients under consideration may be varied during the encoding process as an adaptive method. Also, the frequency domain sum of absolute differences (FD-SAD) can be substituted for the FD-MAD without loss of function.

Also, according to the MPEG standards, the DC-coefficient, the coefficient in the 0,0 position of the DCT results, must always be encoded by itself. Consequently, the DC-coefficient can be excluded in the computation of the FD-MAD. For instance, the first example in this text compared an all-black block to an all-white block. The FD-MAD offers several advantages over spatial-domain analysis. First, it identifies blocks that spatial-domain analysis will miss. Second, because of the first advantage, it has the potential of finding blocks that offer better compression. Third, once the block DCTs have been computed, identification of similar blocks is faster due to two reasons: a) the smaller number of values that must be compared, and b) in the case of I-frame reference blocks, the DCTs for the reference blocks have been previously computed. Further analysis is provided below.

Figure 2A:
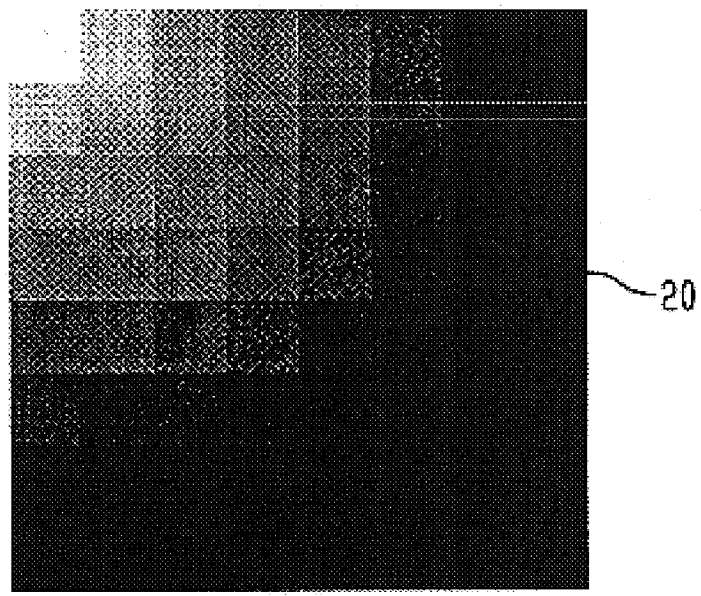
FIGS. 2A and 2B illustrate exemplary reference and sample blocks that are very similar to one another except for a positional shift.
Figure 2B:
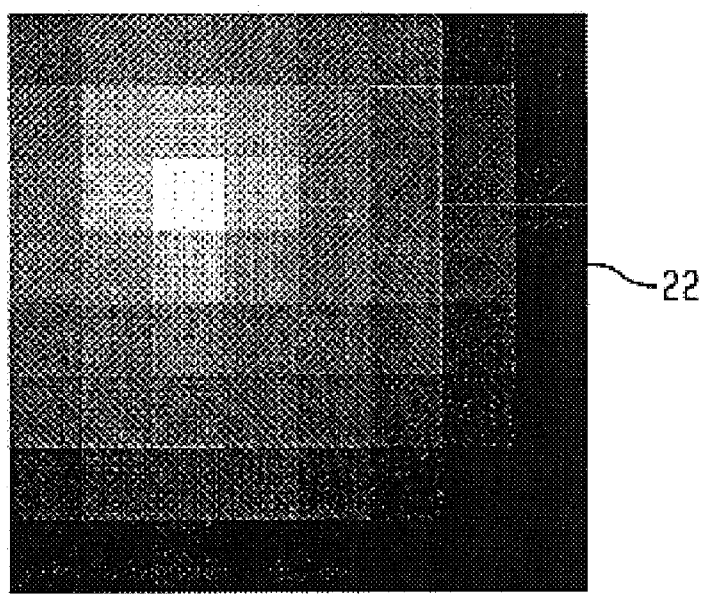

A frequent occurrence in the search for matching blocks is that one block can be very similar to another block except for a positional shift. Such a pair is shown in FIGS. 2A and 2B, which depict a pair of blocks 20 and 22 representing portions of an image of a point-illuminated spher. In the reference block 20, the center of the projection of the sphere is in the upper left corner of the block. In the sample block 22, the center has been moved two pixels down and to the right.

These blocks 20 and 22 are numerically represented as:

| Reference block 20 | | | | | | | | Sample block 22 | | | | | | | |
|---|---|---|---|---|---|---|---|---|---|---|---|---|---|---|---|
| 255 | 218 | 182 | 145 | 109 | 72 | 36 | 0 | 151 | 173 | 182 | 173 | 151 | 123 | 92 | 58 |
| 218 | 203 | 173 | 139 | 104 | 169 | 33 | 0 | 173 | 203 | 218 | 203 | 173 | 139 | 104 | 69 |
| 182 | 173 | 151 | 123 | 92 | 58 | 24 | 0 | 182 | 218 | 255 | 218 | 182 | 145 | 109 | 72 |
| 145 | 139 | 123 | 100 | 72 | 42 | 10 | 0 | 173 | 203 | 218 | 203 | 173 | 139 | 104 | 69 |
| 109 | 104 | 92 | 72 | 48 | 21 | 0 | 0 | 151 | 173 | 182 | 173 | 151 | 123 | 92 | 58 |
| 72 | 69 | 58 | 42 | 21 | 0 | 0 | 0 | 123 | 139 | 145 | 139 | 123 | 100 | 72 | 42 |
| 36 | 33 | 24 | 10 | 0 | 0 | 0 | 0 | 92 | 104 | 109 | 104 | 92 | 72 | 48 | 21 |
| 0 | 0 | 0 | 0 | 0 | 0 | 0 | 0 | 58 | 69 | 72 | 69 | 58 | 42 | 21 | 0 | of the difference of these two blocks, using all 64 values, is 4. Removing the DC-coefficient from the FD-MAD computation would yield an FD-MAD of zero. This would indicate a very good frequency domain match. This method would also use a variable or adaptive number of coefficients for the FD-MAD or FD-SAD computation.

An alternative method for measuring possible matches, possibly leading to better compression, would be to count the number of non-zero entries while computing the FD-MAD. This count would indicate the number of symbols representing non-zero AC coefficients that would need to be encoded and appended to the video-bitstream. In the all-black versus all-white example mentioned previously, the number of frequency or AC-coefficients that would need to be encoded is zero. Thus, only the DC-coefficient and the end-of-block (EOB) symbols would need to be encoded.

The foregoing example illustrates an important aspect of frequency-domain analysis in accordance with the present invention. Inspection is not of the pixel blocks themselves, but of the quantized 2D-DCTs of the blocks. The technique with a spatial-domain difference of:

| | | | | | | | |
|---|---|---|---|---|---|---|---|
| −104 | −45 | 0 | 28 | 42 | 51 | 56 | 58 |
| −45 | 0 | 45 | 64 | 69 | 70 | 71 | 69 |
| 0 | 45 | 104 | 95 | 90 | 87 | 85 | 72 |
| 28 | 64 | 95 | 103 | 101 | 97 | 94 | 69 |
| 42 | 69 | 90 | 101 | 103 | 102 | 92 | 58 |
| 51 | 70 | 87 | 97 | 102 | 100 | 72 | 42 |
| 56 | 71 | 85 | 94 | 92 | 72 | 48 | 21 |
| 58 | 69 | 72 | 69 | 58 | 42 | 21 | 0 | and an SD-MAD of 66. The quantized DCTs of these blocks are:

| Reference block 20 | | | | | | | | Sample block 22 | | | | | | | |
|---|---|---|---|---|---|---|---|---|---|---|---|---|---|---|---|
| 66 | 22 | −1 | 0 | 0 | 0 | 0 | 0 | 126 | 17 | −9 | −1 | −1 | 0 | 0 | 0 |
| 22 | 14 | −1 | 1 | 0 | 0 | 0 | 0 | 17 | 3 | −1 | −1 | 0 | 0 | 0 | 0 |
| −1 | −1 | 0 | 1 | 0 | 0 | 0 | 0 | −9 | −1 | 1 | 0 | 0 | 0 | 0 | 0 |
| 0 | 1 | 1 | 0 | 0 | 0 | 0 | 0 | −1 | −1 | 0 | 1 | 0 | 0 | 0 | 0 |
| 0 | 0 | 0 | 0 | 0 | 0 | 0 | 0 | −2 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | which have an FD-MAD of 1. The zigzag quantized DCT of the spatial-domain difference is:

| 60 | −5 | −5 | −8 | −10 | −9 | −1 | −1 |
|---|---|---|---|---|---|---|---|
| −1 | −1 | −2 | −2 | 0 | −2 | −1 | 0 |
| 0 | 0 | 0 | 0 | 0 | 0 | 0 | 0 |
| 1 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |

Once again, frequency domain analysis has a demonstrated ability to identify a reference-differnce pair that spatial domain analysis might have missed. Moreover, a comparison of only the first 16 coefficients would have produced a similar result.

Figure 3A:
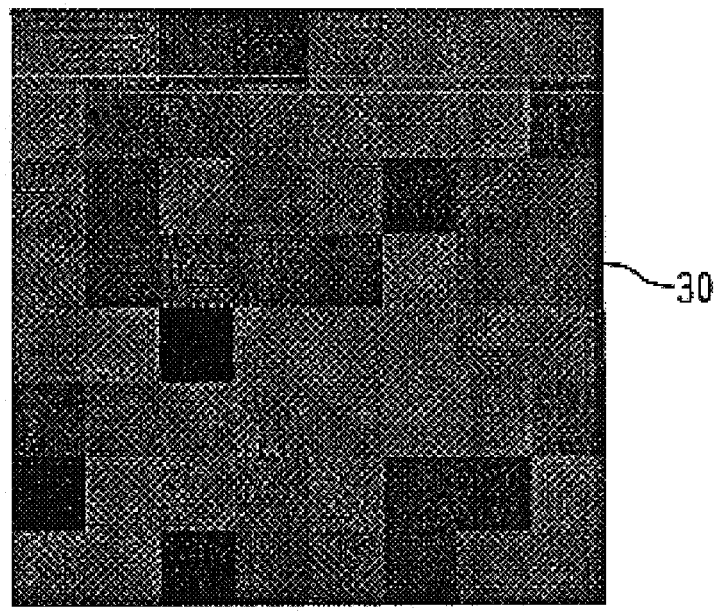
FIGS. 3A and 3B show a pair of pixel blocks, each of which is of a single constant luminance superimposed with moderate normally-distributed high-frequency noise.
Figure 3B:
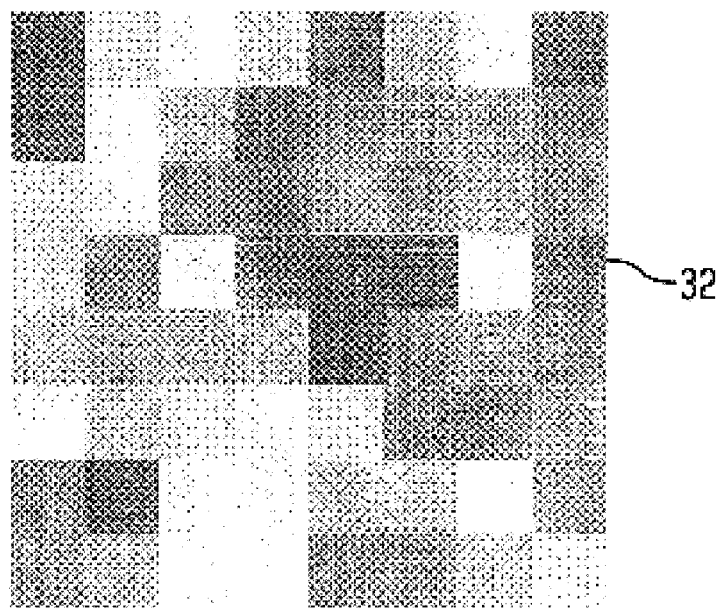

As a further example, FIGS. 3A and 3B show a pair of pixel blocks 30 and 32, each of which is of a single constant luminance superposed with moderate normally-distributed high-frequency noise. The reference block 30 has a nominal intensity of 52 (averaging 57 due to sample effects) while the sample block 32 has an intensity of 220 (actually averaging 221). While these blocks bear very little visual resemblance to each other, the spatial domain MAD is 164, their respective quantized DCTs are:

| Reference block 30 | | | | | | | | Sample block 32 | | | | | | | |
|---|---|---|---|---|---|---|---|---|---|---|---|---|---|---|---|
| 57 | 0 | 0 | 1 | 0 | 0 | 0 | 0 | 221 | 2 | 0 | −1 | −1 | 2 | 0 | 0 |
| −1 | 0 | 0 | 2 | 0 | 1 | 1 | 0 | −1 | 0 | 1 | 1 | −2 | −1 | 0 | 0 |
| 0 | 0 | 1 | 0 | 0 | −1 | −1 | 0 | 1 | −1 | −1 | −1 | −1 | 0 | 0 | 0 |
| 1 | −1 | −1 | 1 | −1 | −1 | 0 | −1 | 0 | 0 | −1 | 0 | 0 | 0 | 0 | 0 |
| 0 | 0 | 2 | 1 | 0 | 0 | 0 | 0 | −1 | 0 | 0 | −1 | −1 | 1 | 0 | 0 |
| −1 | 0 | 0 | −1 | 0 | −1 | 1 | 0 | 0 | 0 | 0 | 0 | 0 | 1 | 0 | 0 |
| 0 | 0 | 0 | 0 | 0 | 0 | 0 | 0 | 1 | 1 | 0 | 0 | 0 | 0 | 0 | 0 |
| 0 | 0 | 0 | −1 | 0 | −1 | 0 | 0 | 0 | 0 | 0 | 0 | 0 | 0 | 0 | 0 | and their frequency domain zigzag DCT difference is

| 164 | 2 | 0 | 1 | 0 | 0 | −2 | 1 |
|---|---|---|---|---|---|---|---|
| −1 | −1 | −1 | 1 | −2 | −1 | −1 | 2 |
| −2 | −1 | 0 | 0 | 1 | 1 | 0 | −2 |
| −1 | −1 | −2 | 0 | 0 | −1 | 1 | 1 |
| −2 | 0 | 1 | 0 | 0 | 0 | 1 | −1 |
| 1 | 1 | 0 | 0 | 0 | 1 | 0 | 0 |
| 0 | 1 | 0 | 2 | 0 | 1 | 0 | −1 |
| 0 | 0 | 1 | 0 | 0 | 0 | 0 | 0 | with an FD-MAD of 3.

One embodiment of frequency-domain analysis in accordance with the present invention has been implemented as a modification to an MPEG-2 encoder provided by the MPEG Software Simulation Group (MPEG-L@netcom.com). This modified encoder and the unmodified original have been used to generate various test results comparing frequency-domain and spatial-domain analysis. As a test vehicle, sixteen 512×512 frames were encoded into two MPEG-2 streams using each of the two encoders. The following system configurations were used in this test.

Figure 4A:
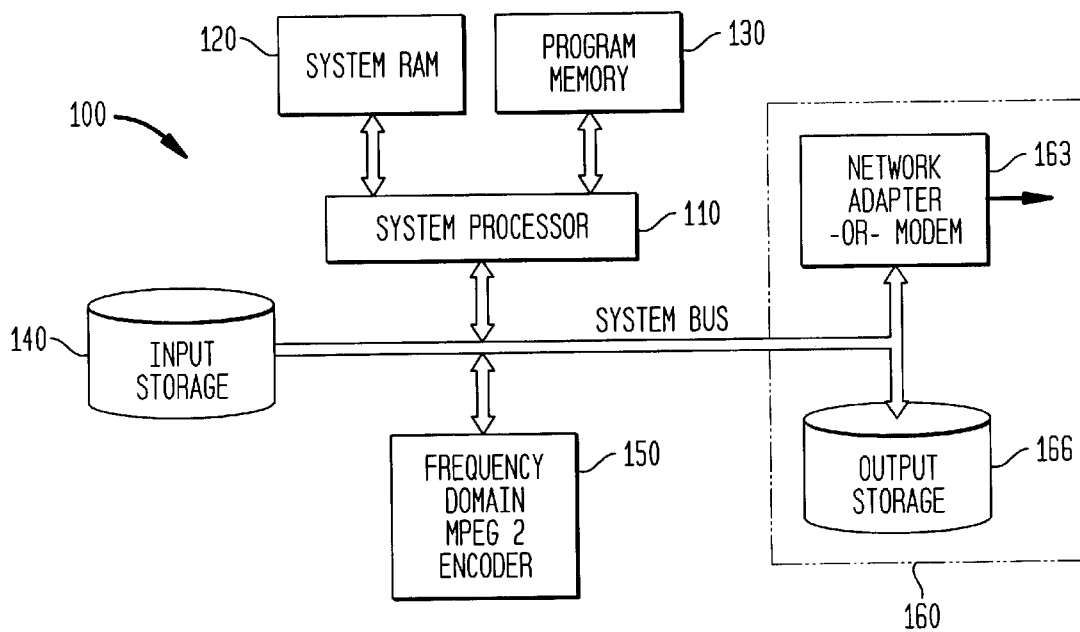
FIGS. 4A and 4B illustrate suitable processing systems for carrying out the present invention.

FIG. 4A illustrates a processing system 100, suitable for implementing the present invention. System 100 includes a system processor 110, system RAM 120, program memory 130, an input storage mechanism 140 which operates as a source of frames to be processed, a frequency domain MPEG 2 encoder 150, and an MPEG encoded output mechanism 160. Output mechanism 160 may suitably comprise a network adapter or modem 163 and an output storage mechanism 166 as shown in FIG. 4A, or may be suitably adapted as desired for a given application. The source of frames 140 provides frames to the frequency domain encoder 150 which provides its output on a system bus to either the network adapter or modem 163 or storage 166. Using a system like system 100, but with a standard spatial domain encoder in place of the frequency domain MPEG 2 encoder 150, SD-MAD encoding of an exemplary video sequence required 119.31 CPU seconds to encode. By comparison, FD-MAD encoding of the same exemplary sequence in accordance with the present invention required only 40.85 CPU seconds so that for this exemplary sequence, the approach of the present invention was 2.92 times faster. Additionally, the encoded SD-MAD MPEG-2 sequence for this example is 326,982 bytes. The encoded FD-MAD sequence is 322,321 bytes for a reduction of 4661 bytes, or, as a percentage, the FD-MAD sequence is 1.4%, smaller. This smaller bitstream is the result of better matches in the frequency domain as opposed to the spatial domain.

Figure 4B:
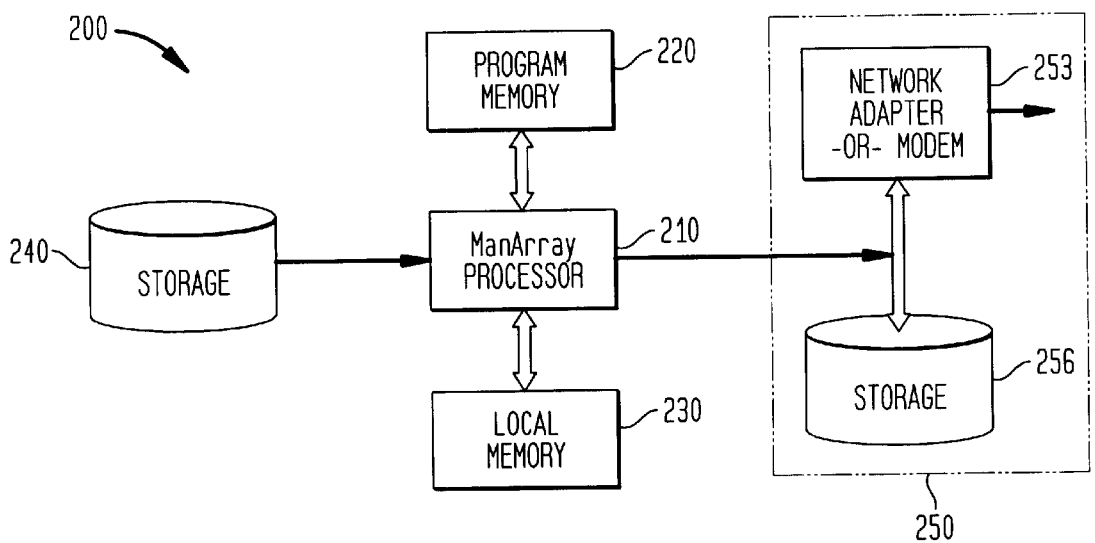

The present invention may also be embodied in a ManArray architecture such as processing system 200 shown in FIG. 4B. The processing system 200 includes a ManArray processor 210, program memory 220, local memory 230, an input storage mechanism 240 which operates as a source of frames to be processed, and an MPEG encoded output 250. Output 250 may suitably comprise a network adapter or modem 253 and an output storage mechanism 256 as shown in FIG. 4B, or may be suitably adapted as desired for a given application. In the processing system 200, the ManArray Processor 210 runs an MPEG-2 encoder program stored in its program memory 220 and uses its local memory 230 to process data using methods described in the present invention. The results are stored as MPEG encoded output data in storage 256 or may be transmitted to a remote location via network adapter, modem, or other transmission mechanism 253.

Further details of a presently preferred ManArray architecture for use in conjunction with the present invention are found in U.S. patent application Ser. No. 08/885,310 filed Jun. 30, 1997, U.S. patent application Ser. No. 08/949,122 filed Oct. 10, 1997, U.S. patent application Ser. No. 09/169,255 filed Oct. 9, 1998, U.S. patent application Ser. No. 09/169,256 filed Oct. 9, 1998, U.S. patent application Ser. No. 09/169,072 filed Oct. 9, 1998, U.S. patent application Ser. No. 09/187,539 filed Nov. 6, 1998, U.S. patent application Ser. No. 09/205,558 filed Dec. 4, 1998, U.S. patent application Ser. No. 09/215,081 filed Dec. 18, 1998, U.S. patent application Ser. No. 09/228,374 filed Jan. 12, 1999, U.S. patent application Ser. No. 09/238,446 filed Jan. 28, 1999, U.S. patent application Ser. No. 09/267,570 filed Mar. 12, 1999, U.S. patent application Ser. No. 09/337,839 filed Jun. 22, 1999, U.S. application Ser. No. 09/350,191 filed July 9, 1999, U.S. patent application Ser. No. 09/422,015 filed Oct. 21, 1999 entitled "Methods and Apparatus for Abbreviated Instruction and Configurable Processor Architecture", as well as, Provisional Application Serial No. 60/113,637 entitled "Methods and Apparatus for Providing Direct Memory Access (DMA) Engine" filed Dec. 23, 1998, Provisional Application Serial No. 60/113,555 entitled "Methods and Apparatus Providing Transfer Control" filed Dec. 23, 1998, Provisional Application Serial No. 60/139,946 entitled "Methods and Apparatus for Data Dependent Address Operations and Efficient Variable Length Code Decoding in a VLIW Processor" filed Jun. 18, 1999, Provisional Application Serial No. 60/140,245 entitled "Methods and Apparatus for Generalized Event Detection and Action Specification in a Processor" filed Jun. 21, 1999, Provisional Application Serial No. 60/140,163 entitled "Methods and Apparatus for Improved Efficiency in Pipeline Simulation and Emulation" filed Jun. 21, 1999, Provisional Application Serial No. 60/140,162 entitled "Methods and Apparatus for Initiating and Re-Synchronizing Multi-Cycle SIMD Instructions" filed Jun. 21, 1999, Provisional Application Serial No. 60/140,244 entitled "Methods and Apparatus for Providing One-By-One Manifold Array (1×1 ManArray) Program Context Control" filed Jun. 21, 1999, Provisional Application Serial No. 60/140,325 entitled "Methods and Apparatus for Establishing Port Priority Function in a VLIW Processor" filed Jun. 21, 1999, and Provisional Application Serial No. 60/140,425 entitled "Methods and Apparatus for Parallel Processing Utilizing a Manifold Array (ManArray) Architecture and Instruction Syntax" filed Jun. 22, 1999 respectively, all of which are assigned to the assignee of the present invention and incorporated by reference herein in their entirety.

Figure 5A:
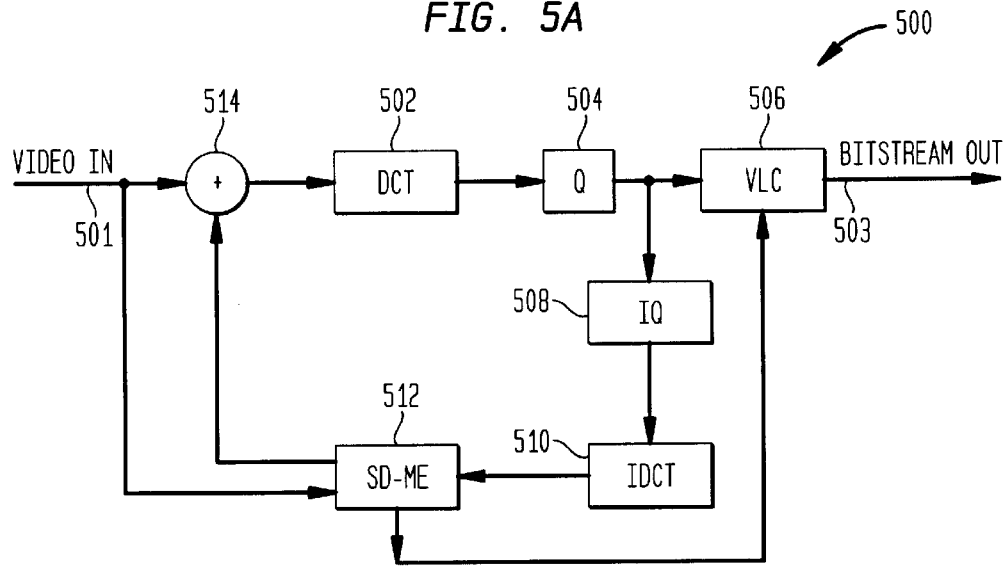
FIG. 5A illustrates an MPEG encoder including a spatial domain motion estimation function.

FIG. 5A illustrates data flow for an MPEG encoder using a spatial domain motion estimation process. The data flow starts with the incoming video at input 501. The first frame to be encoded is an I-frame and passes directly through selector 514, without any input from spatial-domain motion estimation (SD-ME) processor 512, to the DCT processor 502. The DCT processor 502 converts the spatial data to its frequency domain counterpart. The data is then quantized in quantizer 504 to reduce the amount of information as part of the compression process. The new quantized values are directed to a variable length code encoding processor 506 where a combination of zigzag scan reordering, run length encoding, and variable length encoding processes are performed to create data as part of an output bitstream 503. Also, since this I-frame is to be used as a reference frame, the quantized frequency domain data is converted back into the spatial domain. The data is first inverse-quantized in inverse quantizer 508, then converted with an inverse discrete cosine transform (IDCT) by an IDCT processor 510. The data is then sent to the spatial-domain motion estimation processor 512 for storage and future processing.

After the completion of the first frame, the second frame to be encoded is typically a P-frame. Since the P-frame consists of MVs and difference blocks, a different flow occurs. The current macroblock being encoded enters the flow as part of the incoming video at input 501 and is directed to the spatial-domain motion estimation processor 512. The SD-ME processor typically uses a block-matching algorithm, with an SD-SAD or an SD-MAD computation, to find the motion vectors (MVs). The MVs are sent to the VLC encoding processor 506, and used in the computation of the difference block by the SD-ME processor 512. The difference block is then sent to selector 514 as an input to the compression and encoding steps carried out by DCT processor 502, quantizer 504, and VLC encoding processor 506. The resulting data is appended to the output bitstream 503. Also, since a P-frame can be used as a reference frame, the quantized data is sent through inverse quantizer 508 and IDCT processor 510 to SD-ME processor 512 for storage and future processing. B-frames follow a similar process, as described in the introductory section, using two reference frames that have been stored as part of the SD-ME process performed by SD-ME processor 512.

Figure 5B:
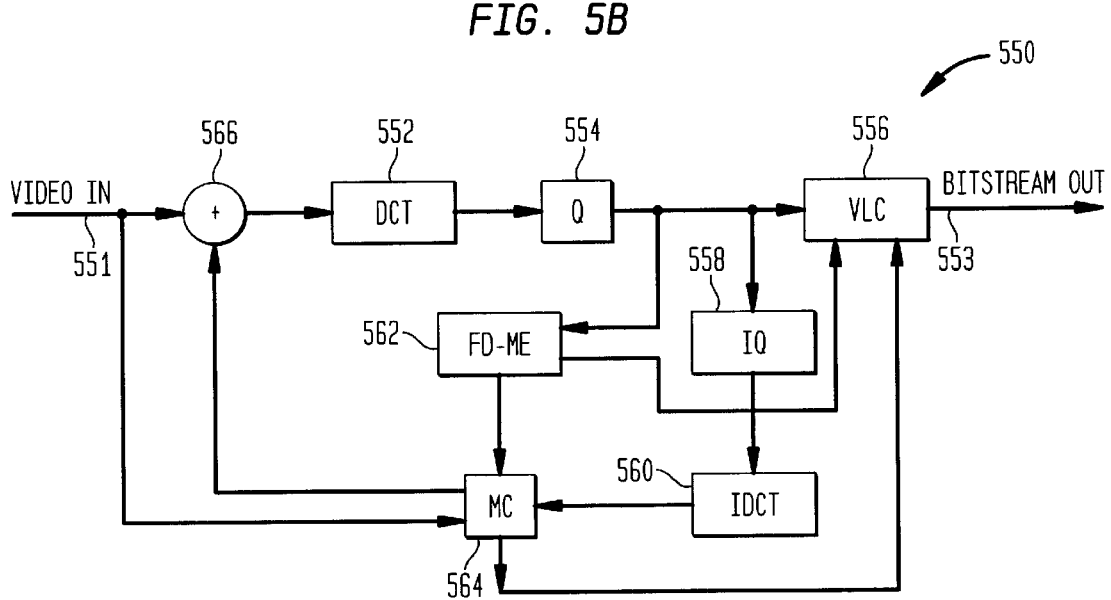
FIG. 5B illustrates an MPEG encoder including a frequency domain motion estimation function in accordance with the present invention.

FIG. 5B illustrates data flow for an MPEG encoder using the frequency domain motion estimation process of the present invention. An I-frame is encoded in a similar manner as discussed above in connection with FIG. 5A. The incoming video on video input 551 is directed through selector 566 and is converted from spatial-domain data to frequency domain data by the DCT processor 552. The data is then quantized in quantizer 554. The data then is processed through the zigzag scan ordering, run length encoding, and variable length encoding processes in variable length encoding processor 556 and appended to an output bitstream 553. A copy of the quantized output is also sent to frequency-domain motion estimation processor 562 for storage and future processing. A copy of the quantized output is also sent to the inverse quantization processor 558, then converted back to spatial-domain data by the inverse discrete cosine transform (IDCT) processor 560. This data is then sent to the motion compensation processor 564 for storage and future processing.

After completion of the first frame, the second frame to be encoded is typically a P-frame. Since the P-frame consists of MVs and difference blocks, a different data flow occurs. The current macroblock being encoded enters the flow as part of the incoming video on video input 551 and is directed to the DCT processor 552, via selector 566, and on to the quantization processor 554. The resulting quantized frequency domain data is sent directly to FD-ME processor 562. An FD-MAD search method is used in FD-ME processor 562 to find the best match. The output of the FD-ME processor 562 is an MV. A copy of the MV is sent to the VLC processor 556 for encoding and inclusion in the output bitstream 553. A copy of the MV is also sent to the motion compensation processor 564. Here, a difference macroblock is computed using the reconstructed data previously received from IDCT processor 560 subtracted from the original macroblock pixel data received from the input video on input 551. The resulting difference block is passed along for conversion to frequency data and quantization through blocks 566, 552, and 554. Since this is a P-macroblock, the output of quantizer 554 is sent to FD-ME processor 562 and IQ processor 558 as previously described for the I-frame output. Also, the output of quantizer 554 is sent to VLC processor 556 for the zigzag scan ordering, run length encoding, and variable length encoding processes in VLC processor 556 and appended to the output bitstream 553.

B-frames follow a similar process, as described in the introductory section, using two reference frames that have been stored as part of the FD-ME processor 562 and MC processor 564. While various blocks of both FIGS. 5A and 5B have been described as separate processors, this was done to facilitate and simplify the discussion of data flow and processing. It will be recognized that the recited "processes" might be implemented in a single processor, multiple processors, as functional blocks in an application specific integrated circuit (ASIC) or some combination of the above. For example, various processes may be implemented in a specialized ASIC and other processes implemented in a generalized microprocessor subject to program control and interfaced with the specialized ASIC. With the ManArray architecture, multiple processors may be assigned to different process tasks.

FIG. 6 illustrates various aspects of a motion estimation process 600 in accordance with the present invention. In step 601, a first block to be matched from a current frame being processed is extracted. In step 603, a 2D DCT computation is performed for the block. In step 605, a second block in a search pattern is extracted from the reference frame. In step 607, the FD-MAD for the first and second blocks is computed based on a subset of the quantized DCT values. In step 609, it is determined whether the FD-MAD computed in 607 is less than the lowest FD-MAD previously computed. At the start of the motion estimation process for this block, the value of the lowest FD-MAD is initialized to some large value. If the answer is "yes", the FD-MAD just computed in step 607 replaces the previously computed lowest FD-MAD as the lowest FD-MAD and is stored in a memory in step 611. In step 613, it is determined whether there are additional blocks to be searched in the search pattern. It is noted that at step 609, if the answer was "no", then the process skips step 611 and proceeds directly to step 613.

Assuming "yes" there are further blocks to be searched at step 613, the process 600 loops back up to step 605 and extracts the next block in the search pattern from the reference frame. Steps 605–613 continue to repeat until "no" there are no function blocks to be compared with the block extracted in step 601. Then, the current lowest FD-MAD value is compared with a threshold value in step 615. If the current lowest FD-MAD value is less than the threshold, in step 617, the two blocks corresponding to the lowest FD-MAD value are accepted as a reference-difference pair. In step 619, the process 600 determines if there are more blocks to be matched from the current frame. If the answer is "yes", the process 600 loops back up to step 601 and the process steps are repeated. If the answer is "no", then in step 621, the process 600 returns success/failure and the MVs found to the MPEG encoding processes at VLC processor 556 and MC processor 564 of FIG. 5B, for example. Alternatively, the process 600 may proceed to the next frame of video to be analyzed and repeat itself. Returning to step 615, it is noted that if the lowest FD-MAD is not less than the threshold, the process 600 skips step 617 and proceeds directly to step 619.

Additionally, a hybrid system can be constructed using this frequency domain motion estimation process. A typical spatial domain block matching process or system can use a hierarchical approach. One example is a three-tiered approach. First, a good match using low SD-MAD or SD-SAD, for example, can be found on a block-aligned basis. That is, the coordinates of the blocks being considered for a match to the current block being encoded are integral multiples of 8 pixels in each direction. Then, a second tier search would look for block matches in the search window surrounding the current prospective block on a pixel-aligned basis. Finally, the third tier search would be on a half-pixel basis in the area immediately adjacent to the result of the second tier search.

The FD-MAD approach in the present invention could be advantageously incorporated into a multiple-tier approach as shown by method 700 of FIG. 7. For example, a first tier 702 may use the FD-MAD approach described in the present invention. Then, a second tier 704 and a third tier 706 may use a typical spatial domain block-matching algorithm. Other permutations are possible. For example, using the FD-MAD for the first phase, then using another algorithm to refine the results for a better match.

The size of the subset of quantized DCT values used for the FD-MAD or FD-SAD can be modified either statically or dynamically. For example, a programmer may select a set number of values, say 16, to be used for the computation of the FD-MAD. It is expected that the first 16 values would be used since they statistically represent the more populated values in the quantized 8×8 DCT set of values. However, a programmer may choose to modify the size of the subset based on the particular requirements of the system being designed. Alternatively, the programmer may make the size of the subset dynamic. That is, the encoder may include an adaptive mechanism whereby the size value may be adjusted during the program based on a variety of factors including, but not limited to, compression requirements, results of past searches, and the like.

As mentioned previously, a sample image was encoded using the process of the present invention. This encoding resulted in a 1.4% reduction in the size of the output bitstream as compared to a conventional spatial-domain encoder. This process used a single-tiered approach with 16 quantized DCT values for each 8×8 block being used in the FD-MAD.

The techniques of the present invention offer very fast similar-block identification. They make extensive use of data already computed by the MPEG encoding process. They also provide block-similarity criteria in the frequency domain which offers more good potential block matches than spatial domain analysis, which can further accelerate the speed of the process. Additionally, block matches, identified in the frequency domain, that are more similar in the frequency domain than block matches identified in the spatial domain, offer the potential for better VLC compression without quantization scaling loss.

While the present invention has been disclosed in a presently preferred context, it will be recognized that this invention may be variously adapted to a variety of environments and applications consistent with the disclosure herein and the claims.

We claim:

1. A system for video encoding employing frequency domain based motion estimation comprising:
   an input for receiving frames of video input to be encoded;
   a processor;
   a memory;
   a frequency domain encoder; and
   an output port for outputting encoded video, the system operating to quantize two dimensional discrete cosine transform values for a reference block and a sample block and to encode based upon a frequency domain comparison of a subset of the quantized reference block and a subset of the quantized sample block.

2. The system of claim 1 wherein the system is further operative to choose the quantized two dimensional discrete cosine transform values based on a zigzag scan ordering for the reference block and the sample block.

3. The system of claim 2 wherein a predetermined number of coefficients from the zigzag scan ordering are analyzed for purposes of making said frequency domain comparison of the reference block and the sample block.

4. The system of claim 3 wherein the predetermined number of coefficients is adaptively varied.

5. The system of claim 1 wherein the system is operative to compute a frequency domain mean of absolute differences between the reference quantized block and the sample block.

6. The system of claim 1 wherein the sample block is an I-frame block and the quantized two dimensional discrete cosine transform values for a plurality of reference blocks have been previously computed and stored in the memory.

7. The system of claim 1 wherein the system is operative to perform at least a two tier analysis, the first tier being the frequency domain comparison and the second tier being a spatial domain analysis.

8. A system for video encoding employing frequency domain based motion estimation comprising:
   an input for receiving frames of video to be encoded;
   a processor;
   a memory;
   a program memory for storing a program which directs the processor to compute a quantized two dimensional discrete cosine transform (2D DCT) for a block of a frame of video to be encoded and to perform frequency domain motion estimation based on a subset of said quantized 2D DCT block with respect to a subset of a first reference block, and encoding frames of video input received by the input source; and
   an output port for outputting encoded frames of video.

9. The system of claim 8 wherein the processor subject to the program stored in the program memory is further operative to compute a first frequency domain mean of absolute differences (FD-MAD) value for the block and the first reference block; to compute a second FD-MAD value for the block and a second reference block of a video frame; to determine if the second computed FD-MA value is less than the first computed FD-MAD value; and to replace the first computed FD-MAD value with the second computed FD-MAD value upon determining that the second computed FD-MAD value is less than the first computed FD-MAD value.

10. The system of claim 8 wherein the processor subject to the program stored in the program memory is further operative to compute a first FD-SAD value for the block and the first reference block; to compute a second FD-SAD value for the block and a second reference block of a video frame; to determine if the second computed FD-SAD value is less than the first computed FD-SAD value; and to replace the first computed FD-SAD value with the second computed FD-SAD value upon determining that the second computed FD-SAD value is less than the first computed FD-SAD value.

11. A system for video encoding employing frequency domain based motion estimation comprising:
   an input for receiving frames of video to be encoded;
   a processor;
   a memory;
   a program memory for storing a program which directs the processor to compute a quantized two dimensional discrete cosine transform (2D DCT) for a block of a frame of video to be encoded and to perform frequency domain motion estimation of said block with respect to a first reference block, and encoding frames of video input received by the input source; and
   an output port for outputting encoded frames of video;
   wherein the processor subject to the program stored in the program memory is further operative to compute a first frequency domain mean of absolute differences (FD-MAD) value for the block and the first reference block; to compute a second FD-MAD value for the block and a second reference block of a video frame; to determine if the second computed FD-MAD value is less than the first computed FD-MAD value; and to replace the first computed FD-MAD value with the second computed FD-MAD value upon determining that the second computed FD-MAD value is less than the first computed FD-MAD value;
   wherein the FD-MAD values are computed on a subset of the quantized 2D DCT block data.

12. A system for video encoding employing frequency domain based motion estimation comprising:
   an input for receiving frames of video to be encoded;
   a processor;
   a memory;
   a program memory for storing a program which directs the processor to compute a two dimensional discrete cosine transform (2D DCT) for a block of a frame of video to be encoded and to perform frequency domain motion estimation of said block with respect to a first reference block, and encoding frames of video input received by the input source; and
   an output port for outputting encoded frames of video;
   wherein the processor subject to the program stored in the program memory is further operative to compute a first frequency domain mean of absolute differences (FD-MAD) value for the block and the first reference block; to compute a second FD-MAD value for the block and a second reference block of a video frame; to determine if the second computed FD-MAD value is less than the first computed FD-MAD value; and to replace the first computed FD-MAD value with the second computed FD-MAD value upon determining that the second computed FD-MAD value is less than the first computed FD-MAD value;
   wherein the FD-MAD values are computed after excluding a DC-coefficient, the coefficient in the 0,0 position of the 2D-DCT.

13. A system for video encoding employing frequency domain based motion estimation comprising:
   an input for receiving frames of video to be encoded;

a processor;

a memory;

a program memory for storing a program which directs the processor to compute a quantized two dimensional discrete cosine transform (2D DCT) for a block of a frame of video to be encoded and to perform frequency domain motion estimation of said block with respect to a first reference block, and encoding frames of video input received by the input source; and an output port for outputting encoded frames of video;

wherein FD-SAD values are computed on a subset of the quantized 2D DCT block data.

14. A system for video encoding employing frequency domain based motion estimation comprising:

an input for receiving frames of video to be encoded;

a processor;

a memory;

a program memory for storing a program which directs the processor to compute a two dimensional discrete cosine transform (2D DCT) for a block of a frame of video to be encoded and to perform frequency domain motion estimation of said block with respect to a first reference block, and encoding frames of video input received by the input source; and an output port for outputting encoded frames of video;

wherein FD-SAD values are computed after excluding a DC coefficient, the coefficient in the 0,0 position of the 2D-DCT.

15. A method for video encoding employing frequency domain based motion estimation comprising the steps of:

extracting a first block to be matched from a current frame;

computing a two dimensional discrete cosine transform for the first block;

extracting a second block from a reference frame;

computing a two dimensional discrete cosine transform for the second block;

computing a frequency domain mean of absolute differences (FD-MAD) for a subset of the first two dimensional discrete cosine transform block and a subset of the second two dimensional discrete cosine transform block;

determining if the computed FD-MAD is less than a previously determined and stored lowest FD-MAD value;

replacing the previously determined and stored lowest FD-MAD value with the computed FD-MAD value if the computed FD-MAD value is less than said lowest FD-MAD value;

determining if additional blocks in the reference frame remain to be searched;

extracting a third block from the reference frame;

computing an FD-MAD for the first and third blocks;

determining if the computed FD-MAD for the first and third blocks is less than the stored lowest FD-MAD value;

encoding and outputting the current frame; and wherein said FD-MAD is computed after excluding a DC-coefficient corresponding to the 0,0 position of the two dimensional discrete transform.

16. A method for video encoding employing frequency domain based motion estimation comprising the steps of:

extracting a first block to be matched from a current frame;

computing a two dimensional discrete cosine transform for the first block;

extracting a second block from a reference frame;

computing a two dimensional discrete cosine transform for the second block;

computing a frequency domain mean of absolute differences (FD-MAD) for a subset of the first two dimensional discrete cosine transform block and a subset of the second two dimensional discrete cosine transform block;

determining if the computed FD-MAD is less than a previously determined and stored lowest FD-MAD value;

replacing the previously determined and stored lowest FD-MAD value with the computed FD-MAD value if the computed FD-MAD value is less than said lowest FD-MAD value;

determining if additional blocks in the reference frame remain to be searched;

encoding and outputting the current frame; and determining if the lowest FD-MAD at the time it is determined that no further blocks in the reference frame remain to be searched is less than a threshold value.

17. The method of claim 16 wherein the blocks corresponding to the lowest FD-MAD at the time it is determined that no further blocks in the reference frame remain to be searched are accepted as a reference-difference pair.

18. The method of claim 17 wherein a spatial domain analysis is also performed on the blocks of the current frame with respect to the blocks of the reference frame.

19. The method of claim 18 wherein best reference difference pairs from both frequency domain and spatial domain analyses are compared to determine which pairs are overall the best.

20. A method for video encoding employing frequency domain based motion estimation comprising the steps of:

extracting a first block to be matched from a current frame;

computing a two dimensional discrete cosine transform (2D DCT) for the first block;

extracting a second block from a reference frame;

computing a two dimensional discrete cosine transform (2D-DCT) for the second block;

computing a frequency domain sum of absolute differences (FD-SAD) value for a subset of the first two dimensional discrete cosine transform block and a subset of the second two dimensional discrete cosine transform block;

determining if the computed FD-SAD value is less than a previously determined and stored lowest FD-SAD value;

encoding and outputting the current frame;

replacing the previously determined and stored lowest FD-SAD value with the computed FD-SAD value if the computed FD-SAD value is less than said lowest FD-SAD value;

determining if additional blocks in the reference frame remain to be searched; and determining if the lowest FD-SAD value at the time it is determined that no further blocks in the reference frame remain to be searched is less than a threshold value.

21. The method of claim 20 wherein the blocks corresponding to the lowest FD-SAD at the time it is determined that no further blocks in the reference frame remain to be searched are accepted as a reference-difference pair.

22. A method for video encoding employing frequency domain based motion estimation comprising the steps of:
extracting a first block to be matched from a current frame;
computing a two dimensional discrete cosine transform (2D DCT) for the first block;
extracting a second block from a reference frame;
computing a two dimensional discrete cosine transform (2D-DCT) for the second block;
computing a frequency domain sum of absolute differences (FD-SAD) value for a subset of the first two dimensional discrete cosine transform block and a subset of the second two dimensional discrete cosine transform block;
determining if the computed FD-SAD value is less than a previously determined and stored lowest FD-SAD value;
encoding and outputting the current frame;
replacing the previously determined and stored lowest FD-SAD value with the computed FD-SAD value if the computed FD-SAD value is less than said lowest FD-SAD value;
determining if additional blocks in the reference frame remain to be searched;
wherein best reference difference pairs from both frequency domain and spatial domain analyses are compared to determine which pairs are overall the best.

23. A method for video encoding employing frequency domain based motion estimation comprising:
receiving incoming video to be encoded on a video input;
converting a first block of a first frame of the incoming video from spatial domain data to frequency domain data utilizing a two dimensional discrete cosine transform;
quantizing the frequency domain data;
comparing the quantized frequency domain data of the first block with quantized frequency domain data for a second block;
zigzag scan ordering, run length encoding, and variable length encoding the quantized frequency domain of the first block data based upon the comparison, to produce output data;
appending the output data to an output bitstream; and
sending a copy of the quantized frequency domain data of the first block for storage and future processing by a frequency-domain motion estimation processor.

24. The method of claim 23 further comprising:
sending a copy of the quantized frequency domain data of the first block for inverse quantization by an inverse quantizer and conversion back to spatial domain data by a two dimensional inverse discrete cosine transform (2D-IDCT).

25. The method of claim 24 further comprising:
storing the 2D-IDCT processed data for future processing by a motion compensation processor.

26. The method of claim 23 further comprising after completion of the processing of the first frame:
converting a first block of a second frame from spatial domain data to frequency domain data utilizing the two dimensional discrete cosine transform;
quantizing the frequency domain data for the first block of the second frame;
sending the quantized frequency domain data for the first block of the second frame to the frequency domain motion estimation processor; and
finding a best match.

27. The method of claim 26 further comprising:
producing a motion vector for the best match; and
encoding the motion vector for inclusion in the output bitstream.

* * * * *